(12) United States Patent
Kosaka et al.

(10) Patent No.: US 11,790,493 B2
(45) Date of Patent: Oct. 17, 2023

(54) IMAGE PROCESSING DEVICE, CONTROL METHOD, AND CONTROL PROGRAM

(71) Applicant: PFU LIMITED, Kahoku (JP)

(72) Inventors: Kiyoto Kosaka, Kahoku (JP); Keiji Honda, Kahoku (JP)

(73) Assignee: PFU LIMITED, Kahoku (JP)

( * ) Notice: Subject to any disclaimer, the term of this patent is extended or adjusted under 35 U.S.C. 154(b) by 402 days.

(21) Appl. No.: 17/058,581

(22) PCT Filed: Sep. 28, 2018

(86) PCT No.: PCT/JP2018/036517
§ 371 (c)(1),
(2) Date: Nov. 24, 2020

(87) PCT Pub. No.: WO2020/065995
PCT Pub. Date: Apr. 2, 2020

(65) Prior Publication Data
US 2021/0192695 A1   Jun. 24, 2021

(51) Int. Cl.
*G06T 5/00*   (2006.01)
*G06T 7/70*   (2017.01)
*G06T 7/90*   (2017.01)

(52) U.S. Cl.
CPC ............... *G06T 5/005* (2013.01); *G06T 7/70* (2017.01); *G06T 7/90* (2017.01); *G06T 2207/10024* (2013.01)

(58) Field of Classification Search
CPC .. G06T 5/005; G06T 7/70; G06T 7/90; G06T 2207/10024
See application file for complete search history.

(56) References Cited

U.S. PATENT DOCUMENTS

2011/0231131 A1   9/2011   Lee et al.
2017/0163966 A1*  6/2017   Barron ................. G06T 5/002
(Continued)

FOREIGN PATENT DOCUMENTS

CN   108146093 A   6/2018
JP   H05-28313 A   2/1993
(Continued)

OTHER PUBLICATIONS

Wang et al. ("Seal Extraction Based on Local Thresholding Techniques and Color Analysis," International Conference on Service Sciences; Date of Conference: May 22-23, 2014) (Year: 2014).*
(Continued)

*Primary Examiner* — Yubin Hung
(74) *Attorney, Agent, or Firm* — LEWIS ROCA ROTHGERBER CHRISTIE LLP (57) ABSTRACT

Provided are an image processing apparatus, a control method, and a control program for more accurately removing the seal component from the input image including the seal. An image processing apparatus includes an acquisition module to acquire an input image, a detection module to detect a seal area corresponding to a seal in the input image, a calculation module to calculate a seal color ratio for each pixel in the seal area, a background information generating module to generate background information, a seal removal image generating module to generate a seal removal image acquired by removing a seal component from the input image, by synthesizing each pixel in the seal area and the background information corresponding to each pixel, based on the seal color ratio, and an output module to output the seal removal image or information generated using the seal removal image.

15 Claims, 10 Drawing Sheets

(56) References Cited

U.S. PATENT DOCUMENTS

2017/0213330 A1* 7/2017 Pudipeddi ................. G06T 5/50
2019/0051002 A1* 2/2019 Auvray ................. A61B 6/503

FOREIGN PATENT DOCUMENTS

| JP | 2002-140710 A |   | 5/2002 |
| --- | --- | --- | --- |
| JP | 2005-092543 A |   | 4/2005 |
| JP | 2006222482 A | * | 8/2006 |
| JP | 2011-198347 A |   | 10/2011 |
| JP | 2012248948 A | * | 12/2012 |

OTHER PUBLICATIONS

Nourbakhsh et al. ("Automatic Seal Information Reader," International Conference on Computing: Theory and Applications; Date of Conference: Mar. 5-7, 2007) (Year: 2007).*

Chou et al. ("Chinese seal identification," IEEE International Carnahan Conference on Security Technology, Crime Countermeasures; Date of Conference: Oct. 10-12, 1990) (Year: 1990).*

Micenkov et al. ("Stamp Detection in Color Document Images," International Conference on Document Analysis and Recognition; Date of Conference: Sep. 18-21, 2011) (Year: 2011).*

Ueda ("Extraction of signature and seal imprint from bankchecks by using color information," Proceedings of 3rd International Conference on Document Analysis and Recognition; Date of Conference: Aug. 14-16, 1995) (Year: 1995).*

Dey et al. ("Removal of Gray Rubber Stamps," 12th IAPR Workshop on Document Analysis Systems; Date of Conference: Apr. 11-14, 2016) (Year: 2016).*

International Search Report dated Dec. 25, 2018 for corresponding Japanese PCT Application No. PCT/JP2018/036517 (3 pages) with English Translation (2 pages).

Written Opinion dated Dec. 25, 2018 for corresponding Japanese PCT Application No. PCT/JP2018/036517 (4 pages) with English Translation (5 pages).

International Preliminary Report on Patentability dated Mar. 23, 2021 for corresponding Japanese PCT Application No. PCT/JP2018/036517 (5 pages) with English Translation (6 pages).

* cited by examiner

IMAGE PROCESSING DEVICE, CONTROL METHOD, AND CONTROL PROGRAM

CROSS-REFERENCE TO RELATED APPLICATION(S)

This application is a U.S. National Phase Patent Application and claims priority to and the benefit of International Application Number PCT/JP2018/036517, filed on Sep. 28, 2018, the entire contents of which are incorporated herein by reference.

FIELD

The present disclosure relates to an image processing apparatus, a control method, and a control program, and particularly to an image processing apparatus, a control method, and a control program for processing an image including a seal.

BACKGROUND

In a company in which a person in charge manually converts a business form such as an invoice into data, a demand for efficiency improvement of work for data conversion of business forms is rising, since the business burden of the person in charge increases when data conversion of a huge number of business forms is necessary. In order to efficiency improve work for data conversion of the business forms, it is necessary for a computer to correctly recognize characters described in the business forms. However, in the business forms, when a seal is stamped on a character such as a company name to be recognized, there is a possibility that the character may not be recognized correctly.

A business form reading device to read an entry character from a business form stamped with a seal is disclosed (see PTL 1). The business form reading device binarizes shaded image values of the red components of each pixel in a seal imprint area of a color image into black and white, to perform color identification of a pixel of interest when the pixel of interest is black, and to determine that the pixel of interest is red and replace it with white when a value of the red component is larger than a value of the other primary color component. Thus, a red seal imprint becomes white, the entry character and a frame line become black, a portion where the seal imprint on the filling characters and frame lines overlap becomes black.

CITATION LIST

Patent Literature

[PTL 1] Japanese Unexamined Patent Application Publication (Kokai) No. 2005-92543

SUMMARY

The image processing apparatus is required to more accurately remove a seal component from an input image including a seal.

An object of an image processing apparatus, a control method and a control program is to more accurately remove the seal component from the input image including the seal.

According to some embodiments, an image processing apparatus includes an acquisition module to acquire an input image, a detection module to detect a seal area corresponding to a seal in the input image, a calculation module to calculate a seal color ratio for each pixel in the seal area, a background information generating module to generate background information, a seal removal image generating module to generate a seal removal image acquired by removing a seal component from the input image, by synthesizing each pixel in the seal area and the background information corresponding to each pixel, based on the seal color ratio, and an output module to output the seal removal image or information generated using the seal removal image.

According to some embodiments, a control method of an image processing apparatus including an output device, includes acquiring, by the image processing apparatus, an input image, detecting a seal area corresponding to a seal in the input image, calculating a seal color ratio for each pixel in the seal area, generating background information, generating a seal removal image acquired by removing a seal component from the input image, by synthesizing each pixel in the seal area and the background information corresponding to each pixel, based on the seal color ratio, and outputting the seal removal image or information generated using the seal removal image from the output device.

According to some embodiments, a control program of an image processing apparatus including an output device, causes the image processing apparatus to execute acquiring an input image, detecting a seal area corresponding to a seal in the input image, calculating a seal color ratio for each pixel in the seal area, generating background information, generating a seal removal image acquired by removing a seal component from the input image, by synthesizing each pixel in the seal area and the background information corresponding to each pixel, based on the seal color ratio, and outputting the seal removal image or information generated using the seal removal image from the output device.

According to the present embodiment, the image processing apparatus, the control method and the control program can more accurately remove the seal component from the input image including the seal.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

DESCRIPTION OF EMBODIMENTS

Hereinafter, an image processing apparatus, a control method and a control program according to an embodiment, will be described with reference to the drawings. However, it should be noted that the technical scope of the invention is not limited to these embodiments, and extends to the inventions described in the claims and their equivalents.

Figure 1:
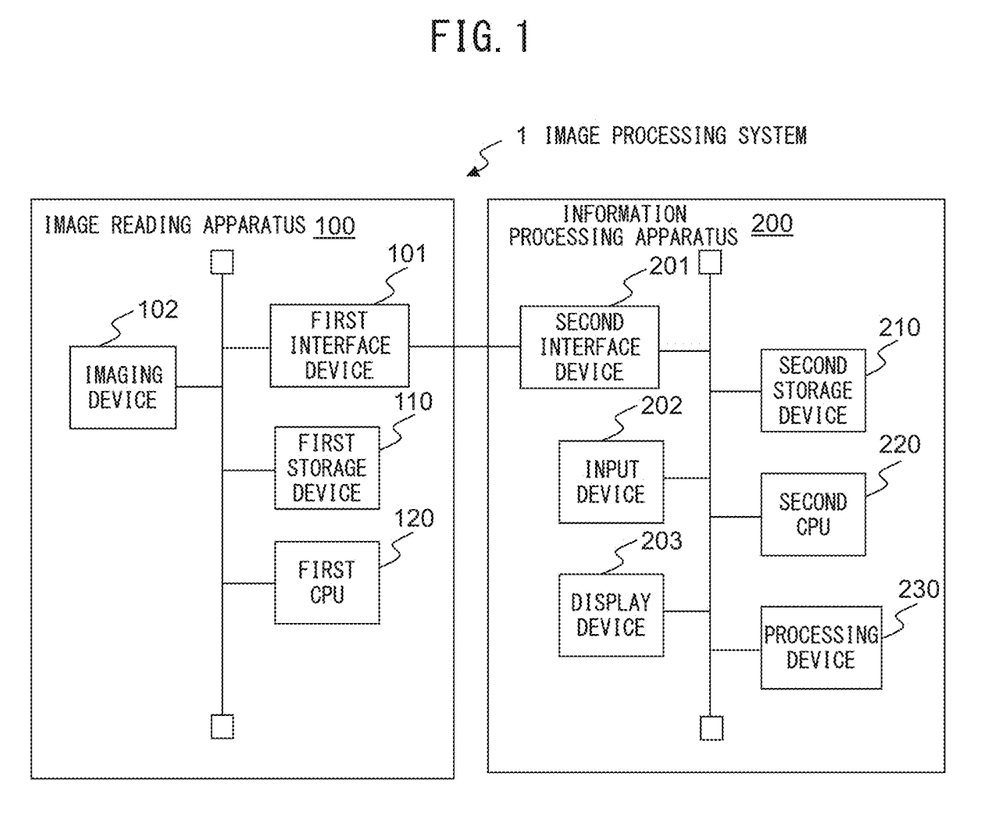
FIG. 1 is a diagram illustrating a schematic configuration of an image processing system 1 according to an embodiment.

FIG. 1 is a diagram illustrating a schematic configuration of an image processing system according to an embodiment. As shown in FIG. 1, the image processing system 1 includes an image reading apparatus 100 and an information processing apparatus 200.

The image reading apparatus 100 is, for example, a scanner device, etc. The image reading apparatus 100 is connected to the information processing apparatus 200. The information processing apparatus 200 is an example of an image processing apparatus, for example, a personal computer, etc.

The image reading apparatus 100 includes a first interface device 101, an imaging device 102, a first storage device 110, and a first CPU (Control Processing Unit) 120.

The first interface device 101 has an interface circuit, according to a serial bus such as a USB (Universal Serial Bus) and electrically connects to the information processing apparatus 200 to transmit and receive image data and various types of information. Instead of the first interface device 101, a communication device having an antenna for transmitting and receiving a wireless signal and a wireless communication interface circuit for transmitting and receiving signals through a wireless communication line according to a predetermined communication protocol may be used. For example, the predetermined communication protocol is a wireless local area network (LAN).

The imaging device 102 includes an image capturing sensor of a reduction optical system type including an image capturing element constituted of charge coupled devices (CCDs) arranged linearly in the main scanning direction. Further, the imaging device 102 includes a light source for irradiating light, a lens for forming an image on the image capturing element, and an A/D converter for amplifying and analog/digital (A/D) converting an electrical signal output from the capturing element. In the imaging device 102, the image capturing sensor images a surface of a conveyed paper to generate and output an analog image signal, and the A/D converter performs A/D conversion of the analog image signal to generate and output a digital input image. The input image is a color multi-valued image in which each pixel data is 24-bit data composed of R (red) values, G (green) values and B (blue) values represented by 8 bits for each RGB color, for example. Note that a contact image sensor (CIS) of an unmagnification optical system type including an image capturing element constituted of a complementary metal oxide semiconductor (CMOS) instead of the CCD may be used.

The storage device 110 includes memory devices such as a RAM (Random Access Memory), a ROM (Read Only Memory), etc., a fixed disk device such as a hard disk, or a portable storage device such as a flexible disk, an optical disk, etc. The storage device 110 stores computer programs, databases, tables, etc., used for various kinds of processing of the image processing apparatus 100. The computer program may be installed on the storage device 301 from a computer-readable, non-transitory medium such as a compact disc read only memory (CD-ROM), a digital versatile disc read only memory (DVD-ROM), or the like by using a well-known setup program etc. The first storage device 110 stores an input image, etc., generated by the imaging device 102.

The first CPU 120 operates according to a program stored in advance in the first storage device 110. Note that a digital signal processor (DSP), a large scale integration (LSI), etc., may be used instead of the first CPU 120. Alternatively, an Application Specific Integrated Circuit (ASIC), a field-programming gate array (FPGA) etc., may be used instead of the first CPU 120.

The first CPU 120 is connected to the first interface device 101, the imaging device 102 and the storage device 110, etc., and controls each of the modules. The first CPU 120 performs document reading control of the imaging device 102, data transmission and reception control with the information processing apparatus 200 via the first interface device 101, etc.

The information processing apparatus 200 includes a second interface device 201, an input device 202, a display device 203, a second storage device 210, a second CPU 220, and a processing device 230. Hereinafter, each part of the information processing apparatus 200 will be described in detail.

The second interface device 201 has an interface circuit similar to the first interface device 101 of the image reading apparatus 100 and connects the information processing apparatus 200 and the image reading apparatus 100. Further, instead of the second interface device 201, a communication device having an antenna for transmitting and receiving a wireless signal and a wireless communication interface circuit for transmitting and receiving signals through a wireless communication line according to a predetermined communication protocol such as wireless LAN, may be used.

The input device 202 includes an input device such as a keyboard, a mouse, and an interface circuit that acquires a signal from the input device, and outputs a signal depending on the user input to the second CPU 220.

The display device 203 is an example of an output device. The display device 203 includes a display constituted of a liquid crystal, an organic electro-luminescence (EL), etc., and an interface circuit that outputs image data to the display, is connected to the second storage device 210, and outputs image data stored in the second storage device 210 to the display.

The second storage device 210 includes memory devices, a fixed disk device, a portable storage device, etc., similar to the first storage device 110 of the image reading apparatus 100. The second storage device 210 stores computer programs, databases, tables, etc., used for various kinds of processing of the information processing apparatus 200. The computer program may be installed on the storage device 301 from a computer-readable, non-transitory medium such as a CD-ROM, a DVD-ROM, or the like by using a well-known setup program etc. The second storage device 210 stores the input image received from the image reading apparatus 100 and various processing images processed on the input image by the processing device 230.

The second CPU 220 operates according to a program stored in advance in the second storage device 210. Note that a DSP, a LSI, an ASIC, a FPGA, etc., may be used instead of the second CPU 220.

The second CPU 220 is connected to the second interfacing device 201, the input device 202, the display device 203, the second storage device 210 and the processing device 230, etc., and controls each of the modules. The second CPU 220 performs data transmission and reception control with the image reading apparatus 100 via the second interface device 201, input control of the input device 202, display control of the display device 203, control of image processing by the processing device 230, etc.

The processing device 230 executes predetermined image processing on the input image. The processing device 230, a CPU, a DSP, a LSI, an ASIC or a FPGA, etc.

Figure 2:
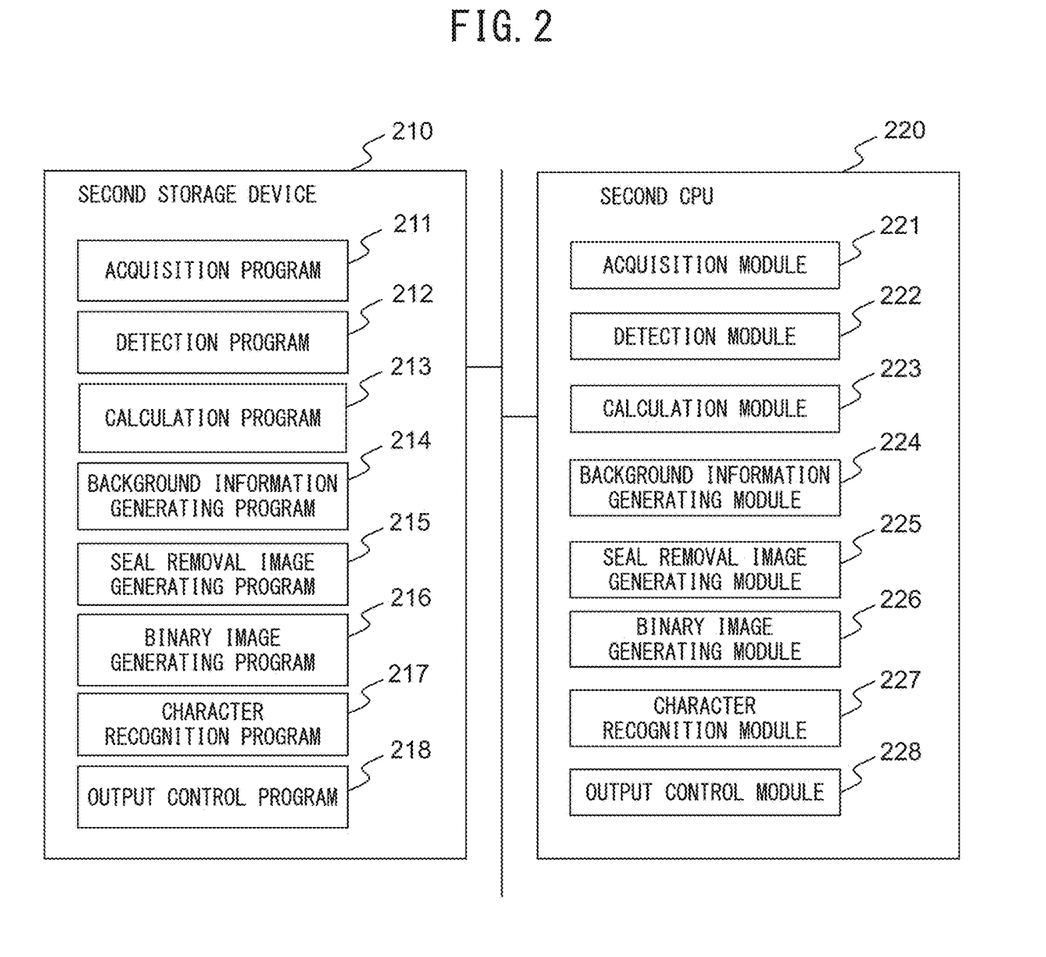
FIG. 2 is a diagram illustrating a schematic configuration of a second storage device 210 and a second CPU 220.

FIG. 2 is a diagram illustrating a schematic configuration of the second storage device 210 and the second CPU 220.

As shown in FIG. 2, each program such as an acquisition program 211, a detection program 212, a calculation program 213, a background information generating program 214, a seal removal image generating program 215, a binary image generating program 216, a character recognition program 217 and an output control program 218, etc., is stored in the second storage device 210. Each of these programs is a functional module implemented by software operating on a processor. The second CPU 220 reads each of the programs stored in the second storage device 210 and operates according to each of the read programs. Thus, the second CPU 220 functions as an acquisition module 221, a detection module 222, a calculation module 223, a background information generating module 224, a seal removal image generating module 225, a binary image generating module 226, a character recognition module 227, and an output control module 228.

Figure 3:
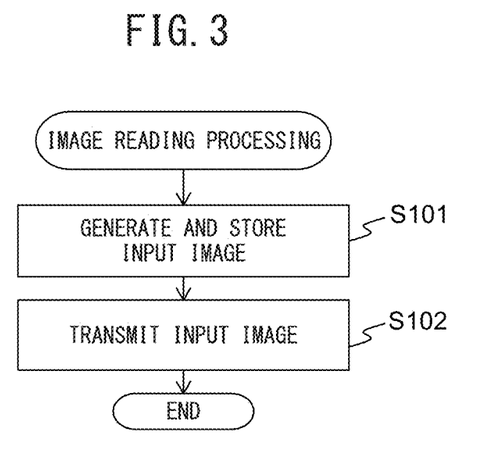
FIG. 3 is a flowchart illustrating an operation of an image reading processing.

FIG. 3 is a flowchart illustrating an operation of an image reading processing performed by the image reading apparatus 100. Hereinafter, the operation of the image reading processing will be described with referring to the flowchart illustrated in FIG. 3. Note that a flow of the operation described below is performed in cooperation with each element of the image reading apparatus 100 mainly by the first CPU 120, based on the program being previously stored in the first storage device 110.

First, the imaging device 102 generates an input image by imaging a business form such as an invoice in which a seal (a name stamp) is stamped, as a document, and stores the input image in the first storage device 110 (step S101).

Next, the first CPU 120 transmits the input image stored in the first storage device 110 to the information processing apparatus 200 through the first interface device 101 (step S102), and ends a series of the steps.

Figure 4:
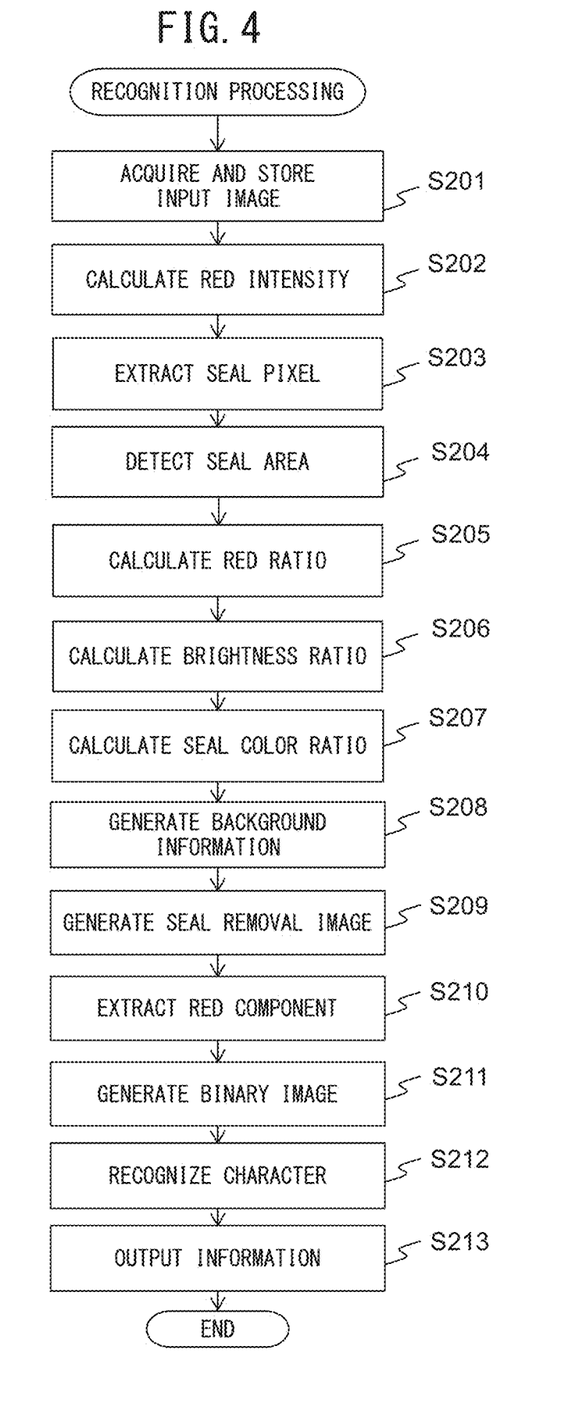
FIG. 4 is a flowchart illustrating an operation of a recognition processing.

FIG. 4 is a flowchart illustrating an operation of a recognition processing by the information processing apparatus 200. Hereinafter, the operation of the recognition processing will be described with referring to the flowchart illustrated in FIG. 4. Note that a flow of the operation described below is performed in cooperation with each element of the information processing apparatus 200 mainly by the second CPU 220, based on the program being previously stored in the second storage device 210.

First, the acquisition module 221 acquires the input image from the image reading apparatus 100 through the second interface device 201 and stores the acquired image in the second storage device 210 (step S201).

Figure 5:
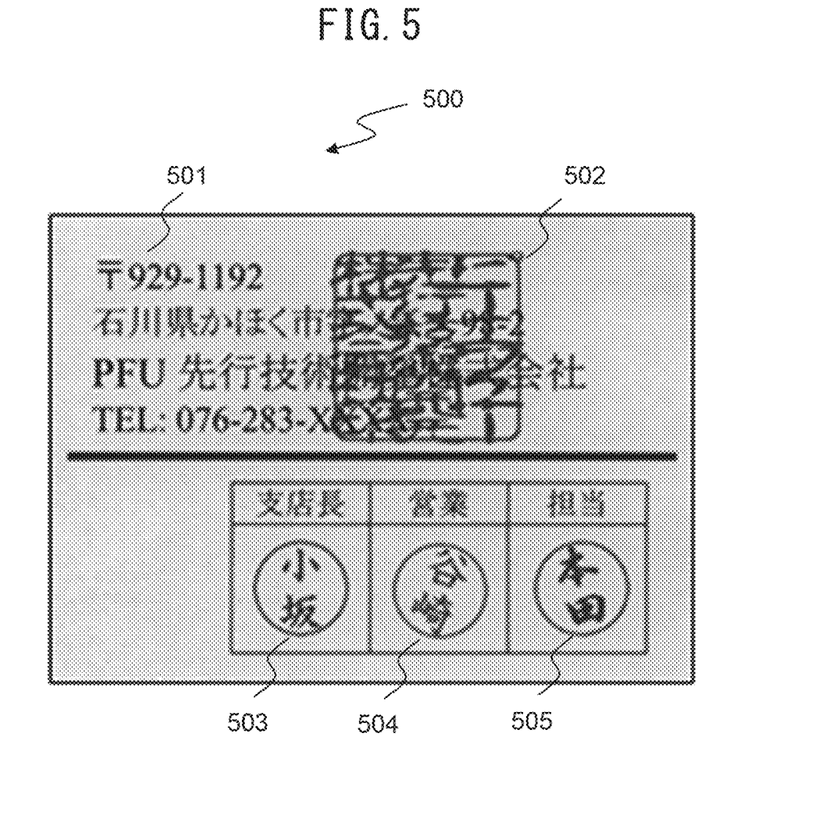
FIG. 5 is a schematic diagram illustrating an example of an input image 500.

FIG. 5 is a schematic diagram illustrating an example of an input image 500.

As shown in FIG. 5, the input image 500 includes characters 501 such as an address, a company name, a telephone number or a position, etc., and seals 502 to 505. The characters 501 have a black color, and the seals 502 to 505 have a red color. Among the seals 502 to 505, the seals 503 to 505 do not overlap with the characters 501, on the other hands, the seal 502 overlap with the characters 501. Therefore, in the area where the characters 501 and the seal 502 overlap, black and red overlap.

Next, the detection module 222 calculates a red intensity for each pixel in the input image (step S202). First, the detection module 222 converts RGB (red, green, blue) values of each pixel in the input image into HSL (hue, saturation, and luminance) values. Next, the detection module 222 extracts a pixel whose hue value is less than a first threshold value (for example, 30) and a pixel whose hue value is more than a second threshold value (for example, 330) (i.e., a pixel having an orange color to a red-violet color). Next, the detection module 222 calculates the red intensity from the RGB value of each pixel, for each extracted pixel, according to the following equation (1).

[Math 1]

$$(\text{red intensity}) = (R \text{ value}) \times 2 - (G \text{ value}) - (B \text{ value}) \quad (1)$$

The red intensity shown by equation (1) is a sum of a value acquired by subtracting the G value from the R value, and a value acquired by subtracting the B value from the R value, and indicates the intensity of the red component of each pixel.

The detection module 222 may use the S (saturation) value of each pixel as the red intensity, as in the following equation (2), for each pixel extracted.

[Math 2]

$$(\text{red intensity}) = (\text{saturation}) = \frac{(\text{MAX value}) - (\text{MIN value})}{(\text{MAX value}) + (\text{MIN value})} \quad (2)$$

Where the MAX value is the maximum value of the R value, the G value, the B value of each pixel, and the MIN value is the minimum value of the R value, the G value, the B value of each pixel.

Next, the detection module 222 extracts a seal pixel based on the calculated red intensity (step S203). The detection module 222, determines a pixel for which the calculated red intensity is equal to or more than a third threshold value (e.g., 32) as the seal pixel, and a pixel for which the calculated red intensity is less than the third threshold value as a non-seal pixel.

Figure 6:
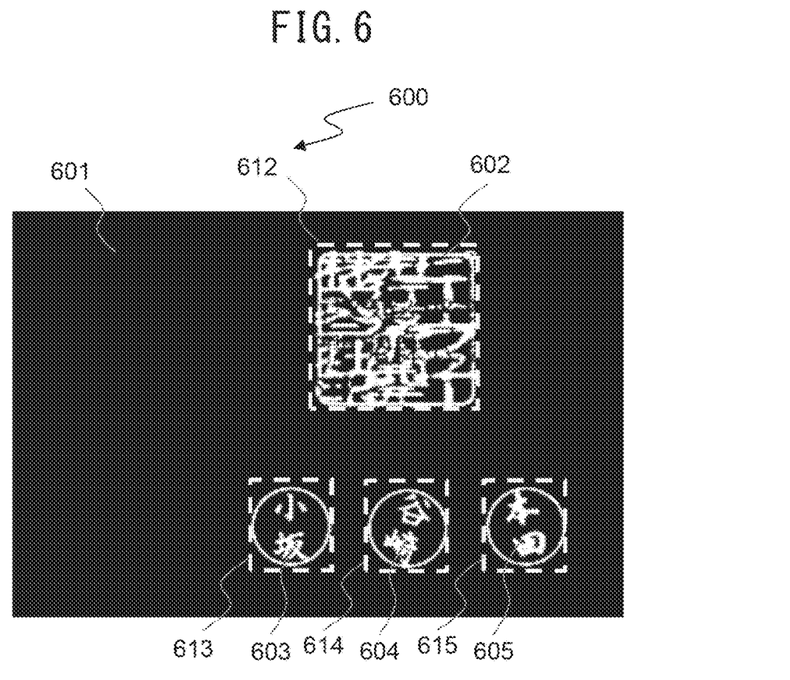
FIG. 6 is a schematic diagram for illustrating a seal pixel.

FIG. 6 is a schematic diagram for illustrating the seal pixel.

In the image 600 shown in FIG. 6, the seal pixels 602 to 605 extracted from the input image 500 shown in FIG. 5 are shown in white, and the non-seal pixels 601 are shown in black. As shown in FIG. 6, pixels corresponding to areas where the seals 502 to 505 appear in the input image 500, i.e., areas having red color, are extracted as the stamp pixels 602 to 605, and the other pixels are extracted as the non-stamp pixels 601. However, for pixels corresponding to areas where the characters 501 and the seal 502 overlaps in the input image 500, i.e., areas having black color and red color, a part is extracted as the non-seal pixels 601, a part is extracted as the seal pixels 602, depending on a balance of an intensity of black color and red color.

Next, the detection module 222 detects an area including an area in which the extracted seal pixels are connected as a seal area including the seal, in other words, a seal area corresponding to the seal in the input image (step S204). The detection module 222 groups an area surrounded by adjacent seal pixels as one group by labeling to detect the area as the seal area. In other words, the seal area includes an inner area of an outer frame of the seal. The detection module 222 may detect only a group whose size (area) is within a predetermined range, among each group, as the seal area. The predetermined range is set in advance in a range that a general seal can be taken.

The detection module 222 may detect only a group having a predetermined shape, among each group, as the seal area. The predetermined shape is set in advance in a shape, such as round, square, etc., that a general seal can be taken. For example, the detection module 222 calculates a normalized cross-correlation value between each group and the predetermined shape, and detects the group as the seal area only when the normalized cross-correlation value calculated for the group is equal to or more than a predetermined value. The detection module 222 may defect a circumscribed rectangle of each group as the seal area.

In the example shown in FIG. 6, the circumscribed rectangles 612 to 615 of the seal pixels 602 to 605 are detected as the seal areas.

Next, the calculation module 223 calculates a red ratio for each pixel in the seal area (step S205). The calculation module 223 calculates the red ratio of each pixel based on the red intensity of each pixel, according to the following equation (3), for each pixel.

[Math 3]

$$(\text{red ratio}) = \frac{(\text{red intensity of target pixel}) - \beta}{\alpha} \quad (3)$$

Where $\alpha$ is a coefficient (e.g., 96), and is set in advance based on a value range width of the red intensity. Further, $\beta$ is an offset value (e.g., 32), and is set in advance based on a value range of the red intensity. The red ratio is set within a range in which the value is equal to or more than 0 and equal to or less than 1. In other words, the red ratio is corrected to 0 when the value calculated by the equation (3) is 0 or less, and the red ratio is corrected to 1 when the value calculated by the equation (3) is 1 or more. The red ratio shown by equation (3) indicates a ratio of a red component among respective color components included in each pixel, and has a larger value as the red component included in each pixel is larger. Thus, the calculation module 223 calculates the red ratio for each pixel based on a relationship between at least two color values among the R value, the G value and the B value of each pixel.

Next, the calculation module 223 calculates a brightness ratio for each pixel in the seal area (step S206). First, the calculation module 223 calculates the brightness of each pixel based on the R value, the G value and B value of each pixel, according to the following equation (4).

[Math 4]

$$(\text{brightness}) = \sqrt{(R\text{value})^2 + (G\text{value})^2 + (B\text{value})^2} \quad (4)$$

The brightness shown by equation (4) indicates a distance from the origin (black) of each pixel indicated by the RGB coordinate system.

The brightness of each pixel may be calculated according to the following equation (5).

[Math 5]

$$(\text{brightness}) = (R \text{ value}) + (G \text{ value}) + (B \text{ value}) \quad (5)$$

In this case, the calculation module 223 can simply calculate the brightness, and shorten the calculation time. Further, the luminance value in the YUV format of each pixel may be used as the brightness of each pixel, as in the following equation (6).

[Math 6]

$$\begin{aligned}(\text{brightness}) &= (\text{luminance value in } YUV \text{ format}) \\ &= 0.299 \times (R \text{ value}) + 0.587 \times \\ &\quad (G \text{ value}) + 0.114 \times (B \text{ value})\end{aligned} \quad (6)$$

Alternatively, the luminance value in the HSL format of each pixel may be used as the brightness of each pixel, as in the following equation (7).

[Math 7]

$$\begin{aligned}(\text{brightness}) &= (\text{luminance value in } HSL \text{ format}) \\ &= \frac{(\text{MAX value}) + (\text{MIN value})}{2}\end{aligned} \quad (7)$$

Thus, the brightness of each pixel is calculated based on the luminance value or the R value, the G value, and the B value of each pixel.

Next, the calculation module 223 calculates a seal color value representing the seal in the seal area. The calculation module 223 calculates an average value of the brightness of 50% of the seal pixels among the seal pixels in the seal area in descending order of the red intensity, as the seal color value. Further, the calculation module 223 calculates a character color value representing a character in the seal area. The calculation module 223 calculates the average value of the brightness of 1% of pixels among pixels in the seal area in ascending order of the brightness (the order close to black color), as the character color value. A statistical value other than the average value, such as the median value of the brightness of each pixel, may be used as the seal color value or the character color value. The calculation module 223 calculates the brightness ratio of each pixel based on the calculated seal color value and character color value, and the brightness of each pixel, according to the following equation (8), for each pixel.

[Math 8]

$$(\text{brightness ratio}) = \frac{(\text{seal color value}) - (\text{character color value})}{2} \times \\ \frac{(\text{brightness of target pixel}) + \frac{(\text{seal color value}) - (\text{character color value})}{2} \times (\text{character color value})}{} \quad (8)$$

The brightness ratio shown by equation (8) indicates a ratio of the brightness of each pixel, which is calculated in consideration of the seal color value and the character color value calculated in the seal area, and has a larger value as the brightness of each pixel increases.

Next, the calculation module 223 calculates a seal color ratio based on the calculated red ratio and the brightness ratio, for each pixel in the seal area (step S207). The calculation module 223 calculates the multiplied value of the red ratio of each pixel and the brightness ratio of each pixel as the seal color ratio of each pixel, according to the following equation (9).

[Math 9]

$$\text{(seal color ratio)} = \text{(red ratio)} \times \text{(brightness ratio)} \quad (9)$$

The calculation module 223 may calculate the average value of the red ratio of each pixel and the brightness ratio of each pixel, as the seal color ratio of each pixel.

Next, the background information generating module 224 generates background information (step S208). The background information generating module 224 generates background information for all pixels in the input image. First, the background information generating module 224 removes noise by applying a smoothing filter, such as an average filter or Gaussian filter, to each pixel of the input image. Next, the background information generating module 224 generates an expanded image acquired by expanding a white component from the input image in which the noise is removed, and determines a pixel value (R value, G value, B value) of each pixel in the expanded image, as the background information of each pixel in the corresponding input image. In other words, the background information corresponding to a target pixel in the input image is set to the pixel value (R value, G value, B value) of the pixel having the highest luminance among peripheral pixels of the target pixel.

Figure 7A:
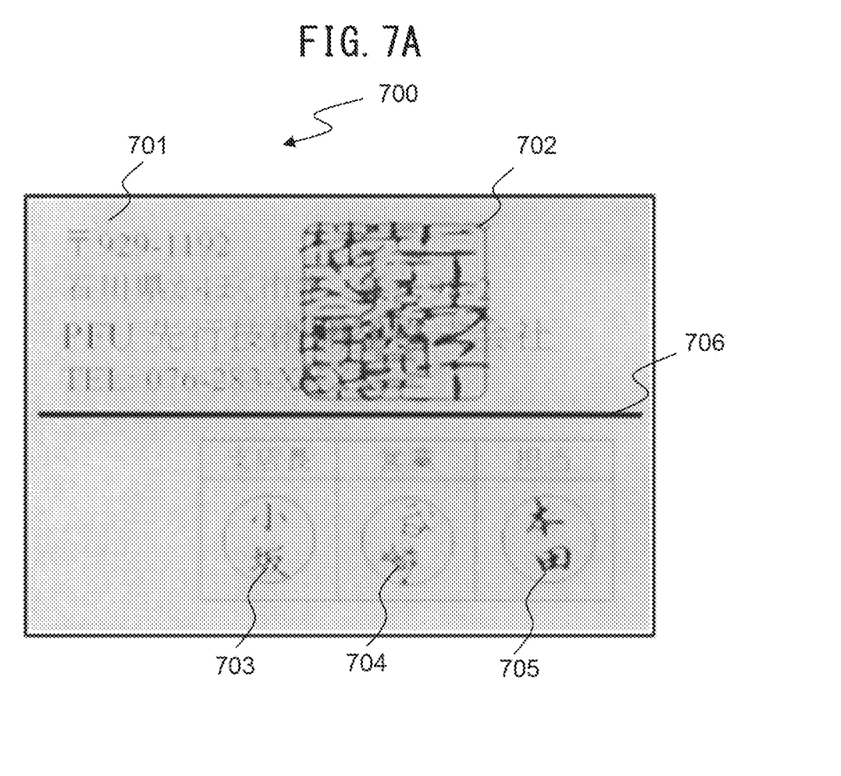
FIG. 7A is a schematic diagram for illustrating a background information.
Figure 7B:
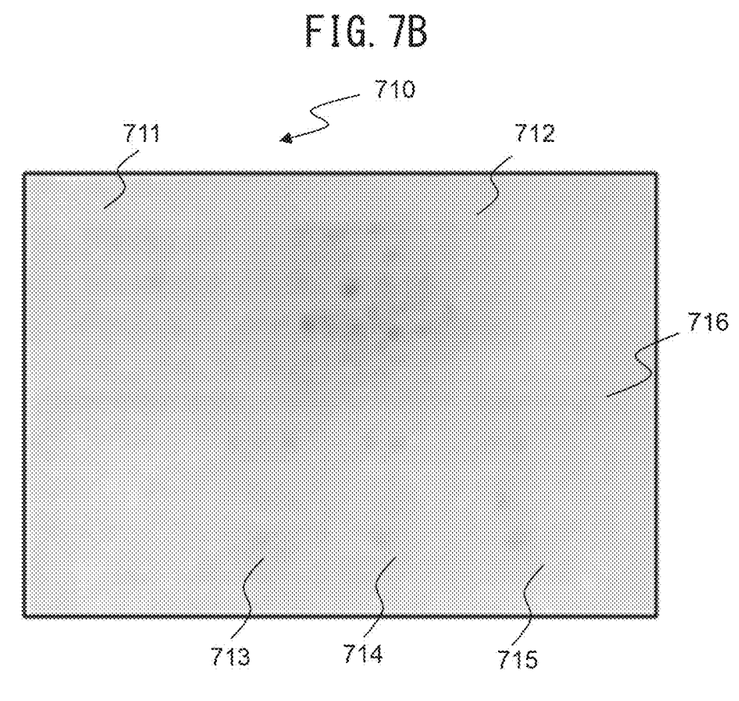
FIG. 7B is a schematic diagram for illustrating the background information.

FIGS. 7A and 7B are schematic diagrams for illustrating the background information.

An image 700 shown in FIG. 7A and an image 710 shown in FIG. 7B are background images consisting of pixels whose pixel values are the background information generated from the input image 500 shown in FIG. 5. The image 700 is the background image generated using a rectangular range in which one side is five pixels around the target pixel, as the peripheral pixel. The image 710 is the background image generated using a rectangular range in which one side is 15 pixels around the target pixel, as the peripheral pixel. In the background image 700, the components of characters 701, seals 702 to 705 and a ailed line 706 remain strongly. On the other hand, in the background image 710, the components of characters 711, seals 712 to 715 and a ailed line 716 are sufficiently small, the characters 711, the seals 712 to 715 and the ruled line 716 is melted into the background. Thus, for example, the background information generating module 224 can generate the background information in which the components of the character, seal and ruled lines are removed, by setting the rectangular range in which one side is 15 pixels around the target pixel as the peripheral pixel.

Next, the seal removal image generating module 225 generates a seal removal image acquired by removing the seal component from the input image (step S209). The seal removal image generating module 225 generates the seal removal image, by synthesizing each pixel in the seal area and the background information corresponding to each pixel, based on the seal color ratio. The seal removal image generating module 225 generates a seal removal image in which the R value, G value, and B value of each pixel are $D_r$, $D_g$, $D_b$ calculated according to the following equation (10), respectively.

[Math 10]

$$D_r = (B_r - S_r) \times \text{(seal color ratio)} + S_r$$

$$D_g = (B_g - S_g) \times \text{(seal color ratio)} + S_g$$

$$D_b = (B_b - S_b) \times \text{(seal color ratio)} + S_b \quad (10)$$

Where $S_r$, $S_g$, $S_b$ are R value, G value, B value of the pixels in the input image corresponding to each pixel, respectively. $B_r$, $B_g$, $B_b$ are R value, G value, B value of the background information corresponding to each pixel, respectively. In other words, the RGB value of each pixel in the seal removal image is closer to the RGB value of the background information as the seal color ratio of each pixel is larger, and is closer to the RGB value of the corresponding pixel in the input image as the seal color ratio of each pixel is smaller.

Figure 8A:
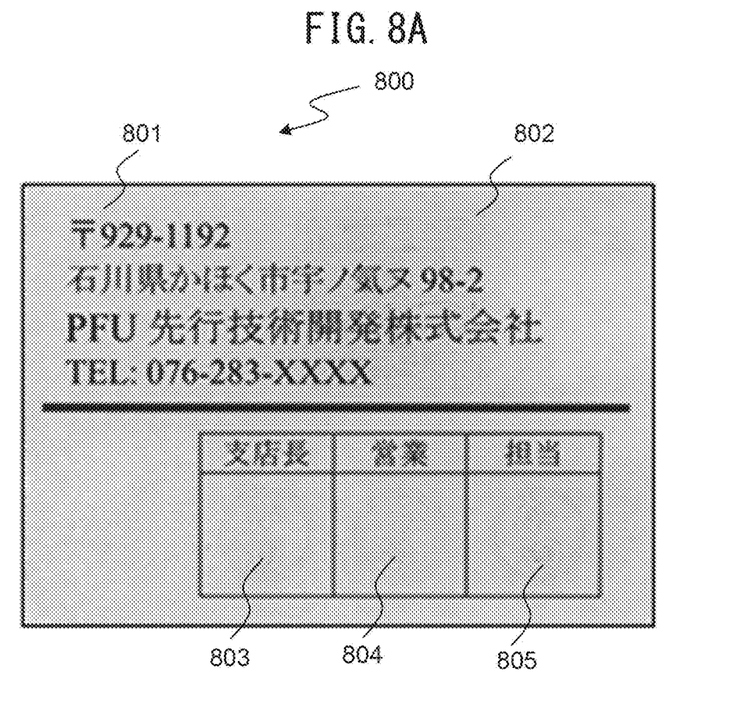
FIG. 8A is a schematic diagram illustrating an example of a seal removal image 800.

FIG. 8A is a schematic diagram showing an example of a seal removal image 800.

The seal removal image 800 shown in FIG. 8A is the seal removal image generated from the input image 500 shown in FIG. 5. As shown in FIG. 8A, in the seal removal image 800, components of seals 802 to 805 are removed satisfactorily while components of characters 801 remain. In particular, in the seal removal image 800, components of the characters 501 overlapped with the seal 502 in the input image 500 remains without being removed with the seal 502.

Figure 8B:
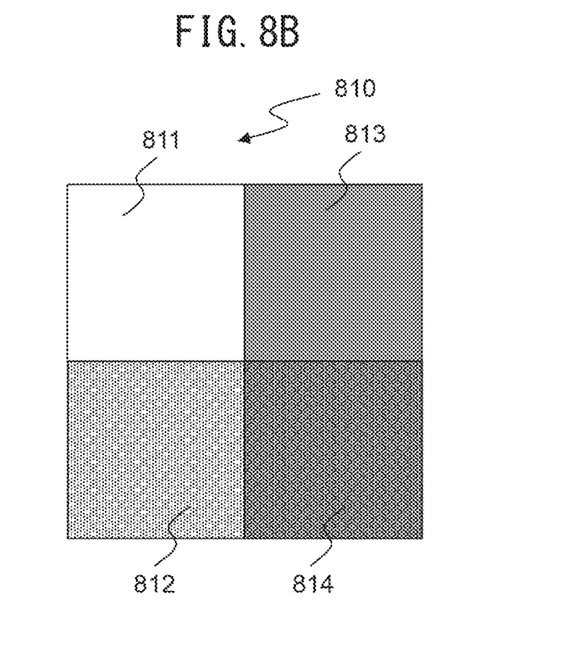
FIG. 8B is a schematic view for illustrating the seal removal image.
Figure 8C:
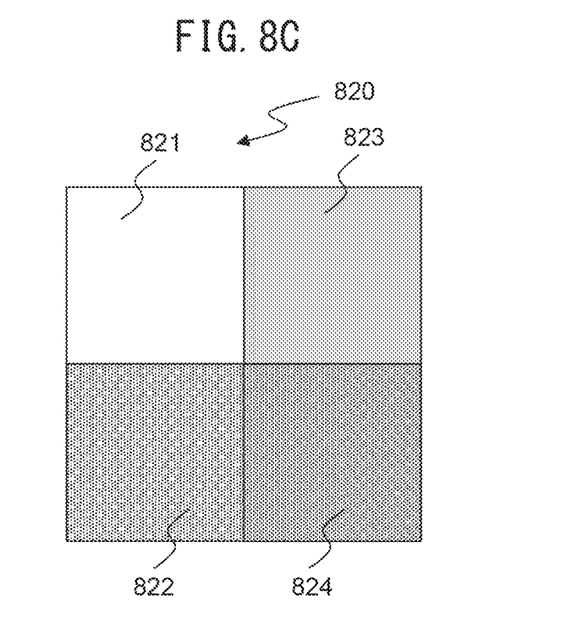
FIG. 8C is a schematic view for illustrating the seal removal image.

FIGS. 8B and 8C are schematic diagrams for illustrating the seal removal image.

FIG. 8B shows a portion of the seal area of the input image 810. An area 811 shows a white background. An area 812 shows a black character. An area 813 shows a red seal stamped on the background. An area 814 shows a seal stamped on the character. In this case, the red ratio of the area 813 is larger than the red ratio of the areas 811 and 812. On the other hand, the red ratio of the area 814 is smaller than the red ratio of the area 813 while the red ratio of the area 814 is larger than the red ratios of the areas 811 and 812 since the red component in the area 814 is small due to the effect of black characters. Further, the brightness ratios of the areas 811 and 813 are larger than the brightness ratios of the areas 812 and 814, respectively.

FIG. 8C shows a part of the seal area in the seal removal image 820 generated from the input image 810. Areas 821, 822, 823 and 824 correspond to the areas 811, 812, 813 and 814, respectively. As described above, the seal removal image generating module 225 synthesizes the RGB value of each pixel and the RGB value of the background information in the input image 810, based on the seal color ratio calculated based on the red ratio and the brightness ratio. Since the RGB value of the background information of the area 811 is substantially same as the RGB value of each pixel of the area 811, the RGB value of the area 821 in the stamp removal image 820 is similar to the RGB value of the area 811 in the input image 810. Further, in the area 812, the seal color ratio is small since the red ratio and the brightness ratio is small. The RGB value of the area 822 in the seal removal image 820 is similar to the RGB value of the area 812 in the input image 810.

On the other hand, in the area 813, the seal color ratio is large since the red ratio and the brightness ratio is large. The RGB value of the area 823 in the seal removal image 820 is closer to the RBG value of the background information than the RGB value of the area 813 in the input image 810 (the area 823 is close to the background). Further, in the area 814, the seal color ratio is smaller than the seal color ratio of the area 813 since the red ratio and the brightness ratio of the area 814 is smaller than the red ratio and the brightness ratio of the area 813. Therefore, the RGB value of the area 824 in the stamp removal image 820 is closer to the RGB value of the area 814 in the input image 810 than the RGB value of the background information (the area 824 is close to the area 814).

Further, the seal removal image generating module 225 synthesizes the RGB values of the pixels in the input image 810 with the RGB values of the background information rather than a fixed RGB value (e.g., a white RGB value). Since the area 823 and the area 824 after synthesis have a shade close to that of the peripheral area, occurrence of an unnatural color in the area from which the seal is removed in the seal removal image is suppressed.

Next, the binary image generating module 226 generates a red component removal image by executing a drop-out processing for removing the red component from the generated seal removal image (step S210). The binary image generating module 226 generates an image generated by setting an R value, a G value and a B value of each pixel in the seal removal image to the R value, as the red component removal image.

Figure 9A:
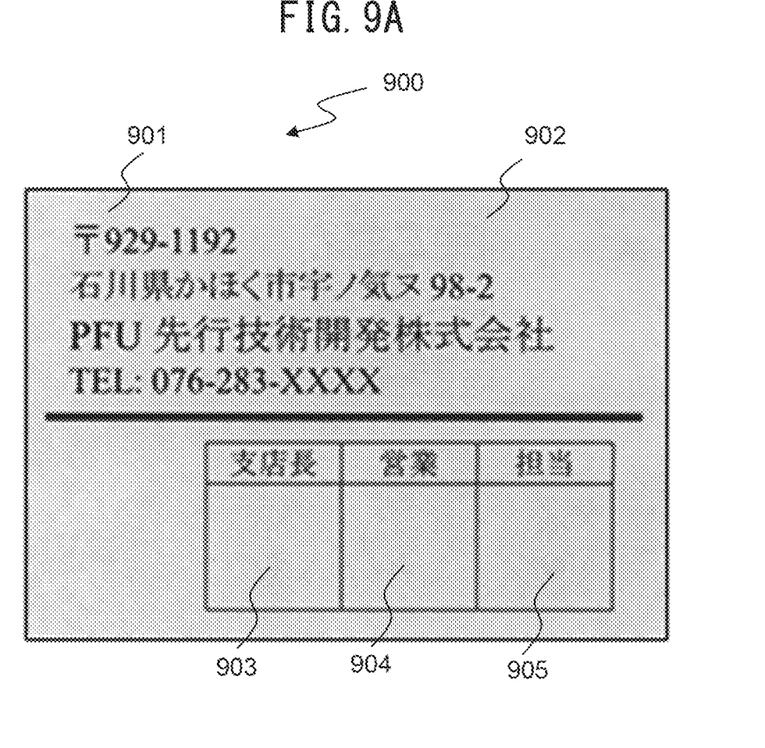
FIG. 9A is a schematic diagram illustrating an example of a red component removal image 900.

FIG. 9A is a schematic diagram illustrating an example of a red component removal image 900.

The red component removal image 900 shown in FIG. 9A is the red component removal image generated from the input image 500 shown in FIG. 5. In the seal removal image 800 shown in FIG. 8A, while the components of the seals 802 to 805 are removed well, the areas of the seals 802 to 805 are slightly reddish. On the other hand, in the red component removal image 900 shown in FIG. 9A, the entire area including the characters 901 and the seals 902 to 905 is represented by the background color, and the components of the seals 902 to 905 are further removed than the seals removal image 800.

Figure 9B:
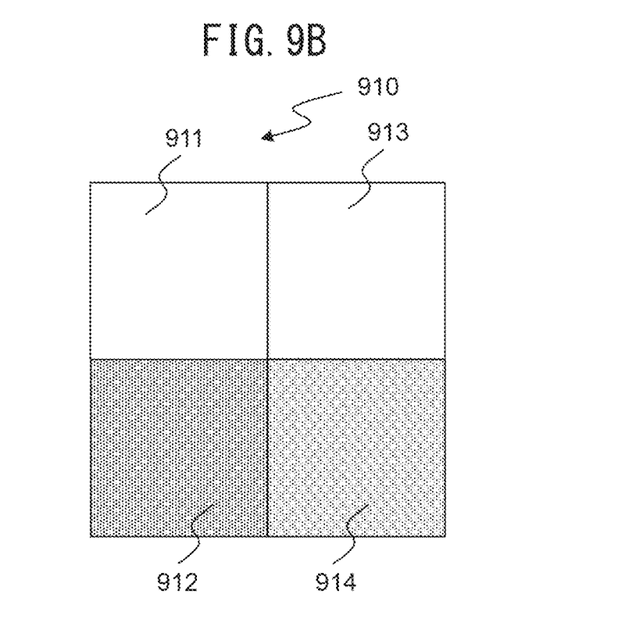
FIG. 9B is a schematic view for illustrating the red component removal image.

FIG. 9B is a schematic view for illustrating the red component removal image.

FIG. 9B shows a part of the seal area of the red component removal image 910 generated from the seal removal image 820 of the FIG. 8C. Areas 911, 912, 913, and 914 correspond to the areas 821, 822, 823 and 824, respectively. The area 821 of the seal removal image 820 has a white color. Since the R value, the G value and B value are all large in white color, the luminance value of the area 911 is large. On the other hand, the area 822 of the seal removal image 820 has a black color. Since the R value, the G value and B value are all small in black color, the luminance value of the area 912 is small.

The area 823 of the seal removal image 820 is generated by synthesizing the area 813 having a red color in the input image 810 and the background information having a white color. Since the R value of the area 823 is large, the luminance value of the area 913 is large. On the other hand, the area 824 of the seal removal image 820 is generated by slightly synthesizing the background information having a white with the area 813 having a reddish black color in the input image 810. Therefore, a red component is slightly contained in the area 813, and the luminance value of the area 913 is a slightly higher value (a value in the middle of white and black).

Next, the binary image generating module 226 generates a binary image by executing a binarization processing to the generated red component removal image (step S211). The binary image generating module 226 generates an image in which a pixel whose luminance value is equal to or more than a fourth threshold value in the red component removal image is set to a white pixel and a pixel whose luminance value is less than the fourth threshold value is set to a black pixel as the binary image. The fourth threshold value is set to be larger than a luminance value of an area (the area 914) corresponding to the seal stamped on the character in the red component removal image by prior experiments. Thus, in the binary image, the pixel corresponding to the character in the input image is a black pixel, and the pixel corresponding to the other pixel in the input image is a white pixel.

Next, the character recognizing module 227 detects a character from the generated binary image using a known OCR (Optical Character Recognition) technique (step S212).

Next, the output control module 228 displays the detected characters on the display device 203 (step S213) and ends the series of steps. The output control module 228 may display the seal removal image, the red component removal image or the binary image on the display device 203, in place of or in addition to the detected characters. Further, the output control module 228 may transmit the detected character, the seal removal image, the red component removal image or the binary image to a server (not shown), etc., via a communication device (not shown). Thus, the output control module 228 outputs the seal removal image or information generated using the seal removal image.

The calculation module 223 may calculate either one of the red ratio and the brightness ratio, for each pixel in the seal area, and calculate the seal color ratio based on the calculated ratio. In that case, the calculation module 223 omits one of the processes of step S205 or S206. In step S207, the calculation module 223 calculates one of the red ratio or the brightness ratio, or a multiplied value of the ratio and a predetermined coefficient or an addition value of the ratio and a predetermined offset, as the seal color ratio. When the information processing apparatus 200 calculates the seal color ratio based on both the red ratio and the brightness ratio, the information processing apparatus 200 can remove the seal component while leaving the character component with higher accuracy. On the other hand, when the information processing apparatus 200 calculates the seal color ratio based on either one of the red ratio and the brightness ratio, the information processing apparatus 200 can generate the seal removal image in a shorter time, and reduce the processing load of the image generation processing.

Further, the background information generating module 224 may generate the background information only for pixels synthesized by the seal removal image generating module 225 in the seal area. In that case, in step S208, the background information generating module 224 generates the background information only for pixels in the seal area rather than generating the background information for all pixels in the input image. Alternatively, the background information generating module 224 may generate the background information only for pixels of which seal color ratio is more than 0. Thus, the information processing apparatus 200 can generate the seal removal image in a shorter time, and can reduce the processing load of the image generation processing.

Further, the binary image generating module 226 may omit the processing of step S210, and generate the binary image from the seal removal image without generating the red component removal image.

As described in detail above, by operating in accordance with the flowchart shown in FIG. 4, the information processing apparatus 200 removes the seal component, by synthesizing each pixel and the background information corresponding to each pixel, based on the seal color ratio of each pixel, in the input image. Thus, the information processing apparatus 200 can more accurately remove the seal component from the input image including the seal.

For example, when the binarization processing is performed directly to the input image based on the luminance value of each pixel, an area of the red seal may become a black pixel similarly to an area of the black character. On the other hand, when the dropout processing for removing the red component is performed directly to the input image, an area where the character and the seal overlap and the red component is strong, may not remain as the character. The information processing apparatus 200 can leave an area where the seal is overlapped on the black character as the character without removing as a seal, by removing the seal component in consideration of the brightness ratio of each pixel.

Further, when the dropout processing for removing the red component is performed directly to the input image, an area of the seal where the red component of the seal is stronger than the red component of the background, may become brighter than the background, and conspicuous. The information processing apparatus 200 can bury the seal component in the background component by closing the seal component to the background component, and suitably remove the seal component, by synthesizing the pixel corresponding to the seal in the input image with the background information.

Figure 10:
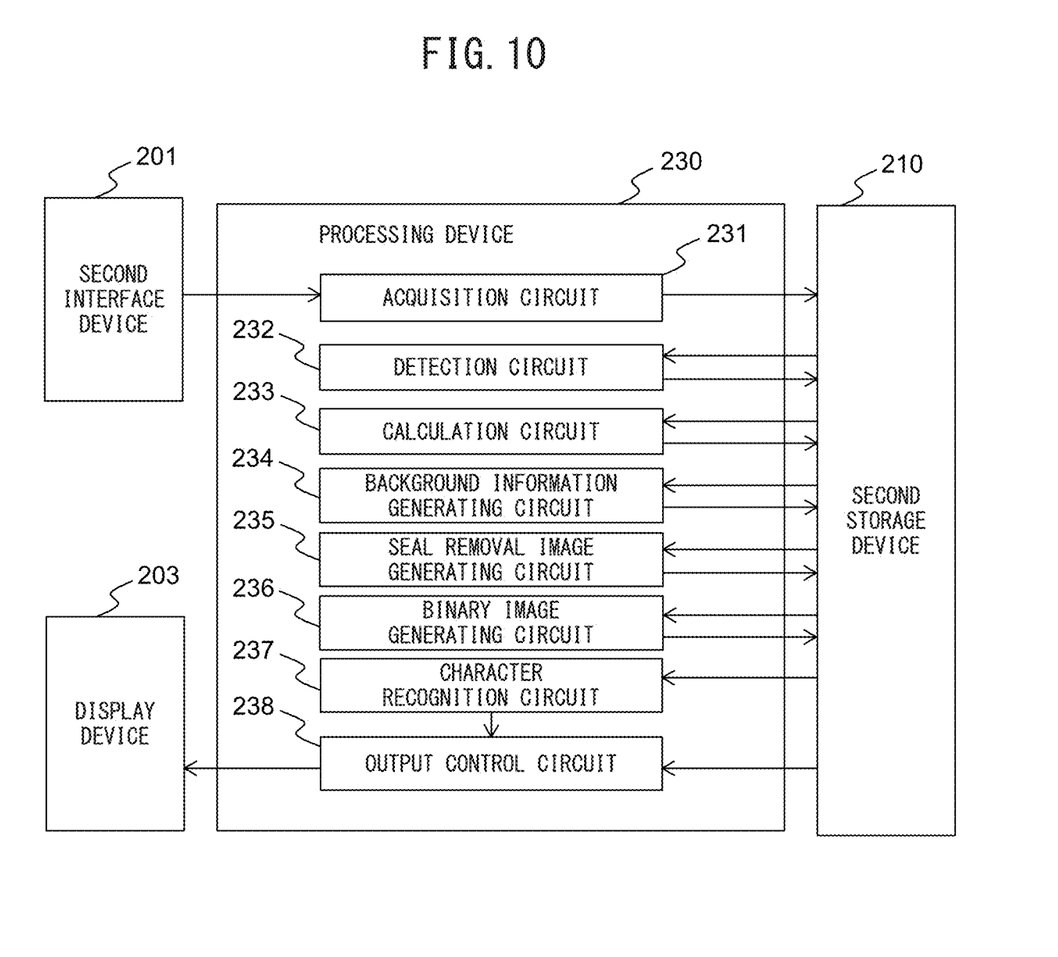
FIG. 10 is a block diagram illustrating a schematic configuration of a processing device 230.

FIG. 10 is a block diagram illustrating a schematic configuration of a processing device 230 in an information processing apparatus according to another embodiment.

The processing device 230 performs a recognition processing instead of the second CPU 220. The processing device 230 includes an acquisition circuit 231, a detection circuit 232, a calculation circuit 233 a background information generating circuit 234, a seal removal image generating circuit 235, a binary image generating circuit 236 a character recognition circuit 237, an output control circuit 238, etc.

The acquisition circuit 231 is an example of the acquisition module and has a function similar to the acquisition module 221. The acquisition circuit 231 acquires the input image from the image reading apparatus 100 via the second interface device 201 and stores it in the second storage device 210.

The detection circuit 232 is an example of a detection module, and has a function similar to the detection module 222. The detection circuit 232 reads the input image from the second storage device 210, detects the seal area corresponding to the seal in the input image, and stores the detection result in the second storage device 210.

The calculation circuit 233 is an example of a calculation module, and has a function similar to the calculation module 223. The calculation circuit 233 reads the input image and the detection result of the seal area from the second storage device 210, calculates the seal color ratio for each pixel in the seal area, and stores it in the second storage device 210.

The background information generating circuit 234 is an example of a background information generating module, and has a function similar to the background information generating module 224. The background information generating circuit 234 reads the input image from the second storage device 210, generates the background information of each pixel in the input image, and stores it in the second storage device 210.

The seal removal image generating circuit 235 is an example of a seal removal image generating module, and has a function similar to the seal removal image generating module 225. The seal removal image generating circuit 235 reads the input image, the detection result of the seal area, the seal color ratio and the background information from the second storage device 210, generates the seal removal image, and stores it in the second storage device 210.

The binary image generating circuit 236 is an example of the binary image generating module, and has a function similar to the binary image generating module 226. The binary image generating circuit 236 reads the seal removal image from the second storage device 210, generates the binary image from the seal removal image, and stores the binary image in the second storage device 210.

The character recognition circuit 237 is an example of a character recognition module, and has a function similar to the character recognition module 227. The character recognition circuit 237 reads the binary image from the second storage device 210, detects characters from the binary image, and stores the detection result in the second storage device 210.

The output control circuit 238 is an example of an output control module, and has a function similar to the output control module 228. The output control circuit 238 reads out the detection result of the character, the seal removal image or the binary image from the second storage device 210, and outputs the read information to the display device 203.

As described in detail above, the information processing apparatus can more accurately remove the seal component from the input image including the seal even when using the processing device 230.

While preferred embodiments have been described above, embodiments are not limited to the above. For example, sharing of functions between the image reading apparatus 100 and the information processing apparatus 200 is not limited to the examples of the image processing systems 1 illustrated in FIG. 1, the components of the image reading apparatus 100 and the information processing apparatus 200 can be provided any of the image reading apparatus 100 and the information processing device 200 as appropriate. Alternatively, the image reading apparatus 100 and the information processing apparatus 200 may be configured as a single apparatus.

For example, the first storage device 110 of the image reading apparatus 100 stores the programs stored in the second storage device 210 of the information processing apparatus 200, and the first CPU 120 of the image reading apparatus 100 may operate as the respective modules realized by the second CPU 120 of the information processing apparatus 200. Further, the image reading apparatus 100 may have the same processing device as the processing device 230 of the information processing apparatus 200.

In that case, the image reading apparatus 100 has the same display device as the display device 203. Since the recognition processing is performed by the image reading apparatus 100, the transmission/reception processing of the input images of steps S102, S201 are omitted. The processing of steps S202 to S213 is performed by the first CPU 120 or the processing device of the image reading apparatus 100. The operation of the processing is similar to that performed by the second CPU 220 or the processing apparatus 230 of the information processing apparatus 200.

Furthermore, the first interface device 101 and the second interface device 201 in the image processing system 1 may be interconnected through a network such as the Internet, a telephone network (including a mobile network and a fixed-telephone network) or an intranet. In that case, each of the first interface device 101 and the second interface device 201 is equipped with an interface circuit for connecting to the network. Additionally, in that case, a plurality of information processing apparatuses may be distributed on the network and the information processing apparatuses may cooperate with one another to perform the recognition processing, etc., in a distributed manner, so that image processing services can be provided in the form of cloud computing. Thus, the image processing system 1 can efficiently perform the recognition processing on the input images read by the plurality of image reading apparatuses.

REFERENCE SIGNS LIST

1 Image processing system
200 Information processing apparatus
221 Acquisition module
222 Detection module
223 Calculation module
30 224 Background information generating module
225 Seal removal image generating module
228 Output control module

The invention claimed is:

1. An image processing method comprising:
acquiring an input image;
detecting a seal area corresponding to a seal in the input image;
calculating a seal color ratio for each pixel in the seal area;
generating background information;
synthesizing, for each pixel in the seal area, a color of said each pixel based on the color of said each pixel, the background information corresponding to said each pixel, and the seal color ratio of said each pixel, to generate a seal removal image in which a seal component in the input image is removed; and
outputting the seal removal image or information generated using the seal removal image.

2. The method according to claim 1, wherein at least one of a red ratio and a brightness ratio is calculated for said each pixel.

3. The method according to claim 2, wherein the red ratio for said each pixel is calculated based on a relationship between at least two color values among a red value, a green value and a blue value of said each pixel;
the brightness ratio for said each pixel is calculated based on a calculated seal color value, a calculated character color value and one of a luminance value, a red value, a green value and a blue value of said each pixel, and wherein
the seal color ratio is calculated based on at least one of the red ratio and the brightness ratio.

4. The method according to claim 1, wherein the input image is a color multi-valued image.

5. An image processing apparatus, comprising:
a processor; and
a memory having stored instruction therein executed by the processor to:
acquire an input image,
detect a seal area corresponding to a seal in the input image,
calculate a seal color ratio for each pixel in the seal area,
generate background information,
synthesize, for each pixel in the seal area, a color of said each pixel based on the color of said each pixel, the background information corresponding to said each pixel, and the seal color ratio of said each pixel, to generate a seal removal image in which a seal component in the input image is removed, and
output the seal removal image or information generated using the seal removal image.

6. The image processing apparatus according to claim 5, wherein the processor calculates at least one of a red ratio and a brightness ratio for said each pixel.

7. The image processing apparatus according to claim 6, wherein
the red ratio for said each pixel is calculated based on a relationship between at least two color values among a red value, a green value and a blue value of said each pixel;
the brightness ratio for said each pixel is calculated based on a calculated seal color value, a calculated character color value and one of a luminance value, a red value, a green value and a blue value of said each pixel, and wherein
the seal color ratio is calculated based on at least one of the red ratio and the brightness ratio.

8. The image processing apparatus according to claim 5, wherein the input image is a color multi-valued image.

9. The image processing apparatus according to claim 5, wherein the processor calculates a red intensity for each pixel in the input image, and extracts seal pixels based on the calculated red intensity, to detect an area including an area in which the extracted seal pixels are connected, as the seal area.

10. The image processing apparatus according to claim 5, wherein the processor generates the background information only for said each pixel in the seal area.

11. The image processing apparatus according to claim 5, wherein the processor sets the background information corresponding to a target pixel to a pixel value of a pixel having the highest luminance among peripheral pixels of the target pixel.

12. A computer-readable, non-transitory medium storing a computer program, wherein the computer program causes a processor, to execute a process, the process comprising:
acquiring an input image;
detecting a seal area corresponding to a seal in the input image;
calculating a seal color ratio for each pixel in the seal area;
generating background information;
synthesizing, for each pixel in the seal area, a color of said each pixel based on the color of said each pixel, the background information corresponding to said each pixel, and the seal color ratio of said each pixel, to generate a seal removal image in which a seal component in the input image is removed; and
outputting the seal removal image or information generated using the seal removal image.

13. The medium according to claim 12, wherein at least one of a red ratio and a brightness ratio is calculated for said each pixel.

14. The medium according to claim 13, wherein the red ratio for said each pixel is calculated based on a relationship between at least two color values among a red value, a green value and a blue value of said each pixel;
the brightness ratio for said each pixel is calculated based on a calculated seal color value, a calculated character color value and one of a luminance value, a red value, a green value and a blue value of said each pixel, and wherein
the seal color ratio is calculated based on at least one of the red ratio and the brightness ratio.

15. The medium according to claim 12, wherein the input image is a color multi-valued image.

* * * * *